United States Patent
Fox et al.

(10) Patent No.: US 10,304,282 B2
(45) Date of Patent: May 28, 2019

(54) AUTONOMOUSLY OPERATING COMPUTERIZED GAMING PLATFORMS AND METHOD OF OPERATING THEREOF

(71) Applicants: PLAYTECH SOFTWARE LIMITED, Douglas (GB); Michael Fox, Walsall (GB); Ethan Ram, Herzliya (IL)

(72) Inventors: Michael Fox, Walsall (GB); Ethan Ram, Herzliya (IL)

(73) Assignee: PLAYTECH SOFTWARE LIMITED, Douglas (GB)

( * ) Notice: Subject to any disclaimer, the term of this patent is extended or adjusted under 35 U.S.C. 154(b) by 0 days.

(21) Appl. No.: 16/069,078

(22) PCT Filed: Jan. 25, 2017

(86) PCT No.: PCT/IL2017/050095
§ 371 (c)(1),
(2) Date: Jul. 10, 2018

(87) PCT Pub. No.: WO2017/130196
PCT Pub. Date: Aug. 3, 2017

(65) Prior Publication Data
US 2019/0019373 A1    Jan. 17, 2019

Related U.S. Application Data
(60) Provisional application No. 62/288,131, filed on Jan. 28, 2016.

(51) Int. Cl.
*G07F 17/32* (2006.01)
*G06F 9/54* (2006.01)

(52) U.S. Cl.
CPC ......... *G07F 17/3241* (2013.01); *G06F 9/541* (2013.01); *G07F 17/3239* (2013.01)

(58) Field of Classification Search
CPC ................. G07F 17/34; G06F 9/541
See application file for complete search history.

(56) References Cited

U.S. PATENT DOCUMENTS

| 7,624,428 | B2 | 11/2009 | Abhinkar et al. |
| 9,039,518 | B2 | 5/2015 | Petersen et al. |

(Continued)

FOREIGN PATENT DOCUMENTS

WO    2016/100471 A1    6/2016

OTHER PUBLICATIONS

May 30, 2018 International Search Report Issued in International Patent Applcation No. PCT/IL2017/050095.

*Primary Examiner* — Robert T Clarke, Jr.
(74) *Attorney, Agent, or Firm* — Oliff PLC

(57) ABSTRACT

A method of operating a first computerized gaming platform comprising: enabling data communication between the first computerized gaming platform and a second computerized gaming platform with the help of an inter-platform wagering module (WM), the first and second computerized gaming platforms operating autonomously one of the other; obtaining data indicative of a player ID associated with a given player and forwarding the data indicative of a player ID to the second gaming platform; requesting from the second gaming platform the most updated player-related data corresponding to the player ID and obtaining the player-related data; and executing by the first gaming platform one or more game-related campaigns for the given player in accordance with the obtained player-related data.

21 Claims, 6 Drawing Sheets

(56) References Cited

U.S. PATENT DOCUMENTS

2007/0010309 A1* 1/2007 Giobbi .................... G07F 17/32
                                                          463/16
2008/0214310 A1   9/2008 Brunet de Courssou et al.
2011/0009184 A1   1/2011 Byng
2014/0335944 A1* 11/2014 Hornik ................ G07F 17/3255
                                                          463/25

* cited by examiner

AUTONOMOUSLY OPERATING COMPUTERIZED GAMING PLATFORMS AND METHOD OF OPERATING THEREOF

CROSS-REFERENCES TO RELATED APPLICATIONS

The present application claims benefit from U.S. Provisional Patent Application No. 62/288,131, filed on Jan. 28, 2016, which is incorporated hereby by reference in its entirety.

TECHNICAL FIELD

The presently disclosed subject matter relates to computerized games and, more particularly, to computerized wagering games.

BACKGROUND

Game operators, and in particular wagering game operators, sometimes operate the same game through different channels. For example, a game may be offered through a land-based channel using one or more land-based electronic gaming machines (EGM), such as may be found in betting shops, adult gaming centers, casinos and retail stores. The game may also be offered online, for example over the Internet. Unlike the land-based channel, which require a player's physical presence at the EGM, players of the online channel can play anytime and anywhere (assuming one has Internet access).

Cross-channel gaming refers to a gaming system architecture in which a player can play the same game in different gaming environments (e.g. in a browser and also on a mobile device).

Problems of managing computerized gaming platforms in cross-channel environments have been recognized in the conventional art and various techniques have been developed to provide solutions, for example:

U.S. Pat. No. 6,811,486 discloses a system and method for maintaining a player's enhanced game play state in a gaming environment. In particular, the player may restore enhanced game play states from previously played games either from the same game device or from another game device, the enhanced game play states typically being enhancements to casino games and including reel nudges, alternate pay table use, and the like.

United States Patent Application No. 2004/0219967 discloses a game of chance involving a progression of events conducted on one or more gaming machines. After receiving a wager from a player at a gaming machine, play of the game is initiated. If the game is paused, the status of the paused game is stored at a central database linked to and remote from the gaming machine. This game status is associated with a personal identifier of the player. To continue play of the game beginning from a point at which the game was paused, the personal identifier is provided to the central database via the same or another gaming machine and the game status associated with the personal identifier is retrieved from the central database.

United States Patent Application No. 2011/0151978 discloses a system for managing transfer of player rights from a first gaming system to a second gaming system comprising a first gaming system comprising a first data structure adapted for storing a set of parameters representing player rights a second gaming system in data communication with the first gaming system; and comprising a second data structure and a synchronization mechanism adapted to synchronize the storage of said player rights parameters in the first and second data structures.

United States Patent Application No. 2015/0170473 discloses a method for enabling a player to use tickets printed at a casino when the player wants to play games in an on-line casino associated with the land-based casino using a virtual ticket system. The method includes: installing a mobile application for the virtual ticket system on a player's mobile device; registering the player with the virtual ticket system using a mobile number of the mobile device; sending a validation key to the mobile number to validate the mobile device; enabling the player to play a game on a gaming machine at the land-based casino; after the player has completed game play in the land-based casino, providing the player with an opportunity to create an electronic ticket that is usable in the on-line casino; and enabling the player to engage in game play in the on-line casino using the player's mobile device or a desktop computer platform.

U.S. Pat. No. 8,469,798 discloses a computerized gaming system operable in a landbased gaming mode controlled by a landbased gaming control unit and in an on-line gaming mode controlled by an on-line gaming control unit operating independently of the landbased gaming control unit, and a method of operating thereof. The method comprises obtaining by the landbased gaming control unit an information related to a player, the information indicative, at least, of said player's balance with regard to the landbased gaming mode. The method further comprises, responsive to the player's switching from the landbased gaming mode to on-line gaming mode, electronically communicating the most updated information indicative, at least, of said player's balance with regard to the landbased gaming mode from the landbased control unit to the on-line control unit controlling the on-line gaming mode, thereby enabling said player to participate in the on-line playing mode.

United States Patent Application No. 2013/0130782 discloses systems and operations for a distributed bonus game feature for wagering game systems. In one example, a wagering game may award a bonus game to a player. A delay period is set for the bonus game. The delay period and other details regarding the bonus game are persistently stored on a paper ticket or in a database on a wagering game server. The bonus game may be initiated (after the delay period) on a different wagering game machine than the machine that awarded the bonus game. In a second example, funding for a bonus game for a player may be determined in accordance with a random number generator on a wagering game machine currently occupied by a player. If the player moves to a different machine, output from a random number generator on the new machine may be used to determine continued funding for the bonus game.

The references cited above teach background information that may be applicable to the presently disclosed subject matter. Therefore the full contents of these publications are incorporated by reference herein where appropriate for appropriate teachings of additional or alternative details, features and/or technical background.

General Description

One of the ways that game operators have found to enrich the gaming experience is to offer game campaigns which may be provided (under certain conditions) to a given player during a game. However, in cross-channel gaming environments there remain challenges to integrate game campaigns between autonomously operated gaming platforms. For example, there is a need for a technical solution enabling reflecting a certain game play achievement reached by a player upon playing in one of the gaming platforms (e.g. a certain rank or level reached in an online game) in subsequent game play in another, autonomously operating gaming platform.

As used herein, a "gaming platform" includes at least one computer comprising a game engine.

As used herein, two gaming platforms, each comprising one or more game engines, are considered to operate "autonomously" when the one or more game engines of one platform operate independently from the one or more game engines of the other one, and when a player identification (player ID) that uniquely identifies a given player on one of the two platforms is not associated with the given player on the other platform.

Non-limiting examples of non-autonomous operating of two gaming platforms include:

- a first online gaming platform hosts the game Tetris™ for web browser clients while a second online gaming platform hosts Tetris™ for mobile app clients. Both platforms share a common game engine and a common database capable to associate a player's ID with the player's credentials provided via any of the platforms (e.g. telephone's ID provided when using the mobile platform and computer's ID provided when using the regular web browser);
- a first online gaming platform hosts the game Tetris™ for web browser clients while a second online gaming platform hosts Tetris™ for mobile app clients. Each platform independently executes respective game engine(s). However, the platforms share a player-related database so that a player can log in to either gaming platform with the same player ID and/or a player can log in to each platform with platform-specific player ID, while the database associates both platform-specific IDs with the same player;
- a casino operates a number of different game terminals, which are capable of executing the same or different games. Each game terminal independently executes a local game engine. All terminals share a common player-related database so that each terminal is capable of accepting a player ID usable to access player-related data (e.g. credits available to the player, etc.).

In accordance with certain aspects of the currently disclosed subject matter, there is provided a method of operating a first computerized gaming platform. The method comprises: enabling data communication between the first computerized gaming platform and a second computerized gaming platform with the help of an inter-platform wagering module (WM), the second computerized gaming platform operating autonomously from the first computerized gaming platform; obtaining at the first gaming platform data indicative of a unique player identification (player ID) associated with a given player at the second gaming platform, and forwarding, via the enabled data communication, the obtained data indicative of player ID to the second gaming platform; requesting from the second gaming platform the most updated player-related data corresponding to the player ID and obtaining, with the help of the WM, the player-related data; and executing by the first gaming platform one or more game-related campaigns for the given player in accordance with the obtained player-related data.

In accordance with other aspects of the currently disclosed subject matter, there is provided a processor-based inter-platform wagering module (WM) configured to operate in conjunction with a first computerized gaming platform and a second computerized gaming platform, the platforms configured to operate autonomously one of the other. The WM can be configured to establish data communication between the first gaming platform and the second gaming platform; obtain at the first gaming platform data indicative of a unique player identification (player ID) associated with a given player at the second gaming platform, and forward, via the established data communication, the obtained data indicative of player ID to the second gaming platform; request from the second gaming platform the most updated player-related data corresponding to the player ID and obtain the player-related data; and enable execution by the first gaming platform of one or more game-related campaigns for the given player in accordance with the obtained player-related data.

In accordance with other aspects of the currently disclosed subject matter, there is provided an electronic gaming machine (EGM) comprising a game engine adaptable to execute a game-related campaign for a player; and an inter-platform wagering module (WM) configured to operatively couple the EGM to an autonomously operated online gaming platform having stored therein player-related data associated with a player and informative of a game-related campaign to execute for the associated player. The EGM is configured to query, using the WM, the online gaming platform for player-related data associated with a given player; obtain, using the WM, player-related data from the online gaming platform in response to said query; and adapt the game engine in accordance with the obtained player-related data to execute a game-related campaign for the given player.

In accordance with other aspects of the currently disclosed subject matter, there is provided an offline gaming platform comprising an electronic gaming machine (EGM) central server operatively coupled to one or more EGM clients, the EGM central server comprising an inter-platform wagering module (WM) configured to establish data communication between the offline gaming platform and an online gaming platform, the two platforms operating autonomously one of the other; obtain at the offline gaming platform data indicative of a unique player identification (player ID) associated with a given player at the online gaming platform, and forward, via the established data communication, the obtained data indicative of player ID to the online gaming platform; request from the online gaming platform the most updated player-related data corresponding to the player ID and obtain the player-related data; and enable execution by the offline gaming platform of one or more game-related campaigns for the given player in accordance with the obtained player-related data.

In accordance with further aspects of the currently disclosed subject matter, and optionally in combination with other aspects, the request for the player-related data can be made in response to at least one predetermined triggering event selected from the group consisting of: the player logging into the first gaming platform; a determination of an availability of suitable means of communication with the second gaming platform; the player selecting a predefined game to play on the first gaming platform; and an event predefined by logic of a game being played on the first gaming platform.

In accordance with further aspects of the currently disclosed subject matter, and optionally in combination with other aspects, the player-related data can be indicative, at least, of one or more tags associated with the given player in the second gaming platform and/or one or more wagering requirement rules associated with the given player in the second gaming platform and/or the given player's status in one or more campaigns available to the given player in the second gaming platform and/or data indicative of one or more messages to be communicated to the given player.

In accordance with further aspects of the currently disclosed subject matter, and optionally in combination with other aspects, the WM can be configured to continuously obtain, with respect to the given player, game-related information at the first gaming platform; track a bonus-related status of the given player in accordance with the game-related information and the wagering requirement rules; when the bonus-related status meets predefined criteria, calculate a wagering bonus in accordance with the wagering requirement rules; and provide data indicative of the calculated wagering bonus to a game engine on the first gaming platform.

In accordance with further aspects of the currently disclosed subject matter, and optionally in combination with other aspects, the first gaming platform can be an offline gaming platform or an online gaming platform and the second gaming platform can be an online gaming platform. The WM can be comprised in and/or integrated with the first gaming platform, second gaming platform, or separate from the first and second gaming platforms. The first gaming platform can be an electronic gaming machine (EGM), or it can comprise an EGM central server operatively coupled to one or more EGM clients. The WM can be comprised in the EGM central server.

Among advantages of certain embodiments of the presently disclosed subject matter is the provided ability of an offline game to use player's data stored in conjunction with the online game and to execute a common campaign as would be executed for the player when playing the online game.

Among further advantages of certain embodiments of the presently disclosed subject matter is the ability to enable an offline game to execute the common campaign in absence of a persistent communication link with the online gaming platform.

Among further advantages of certain embodiments of the presently disclosed subject matter is the ability for a game operator to support a cross-channel gaming experience by enabling campaigns or features unlocked for a player in one gaming platform to be used by the player in a different gaming platform operating autonomously from the first gaming platform.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1A:
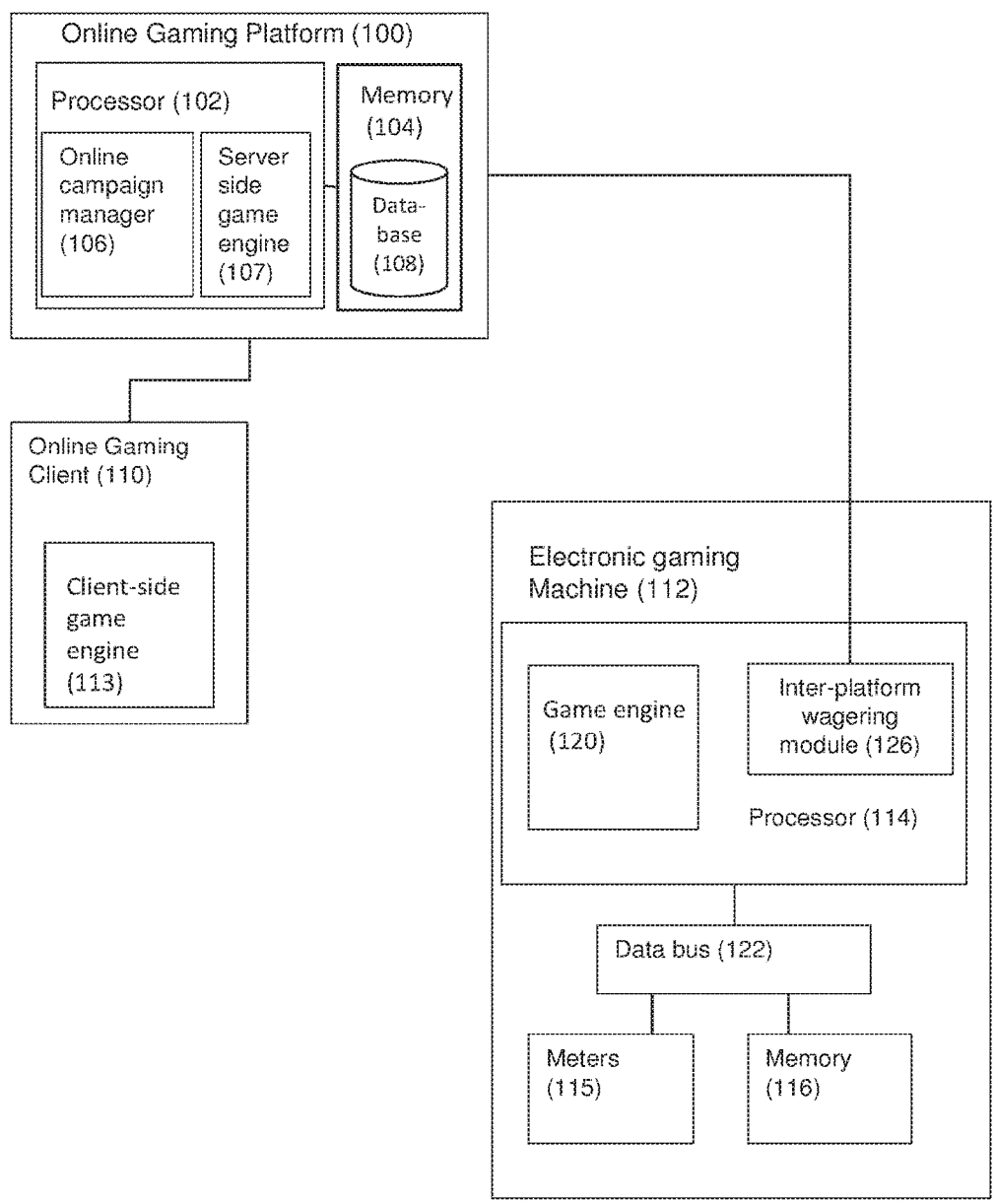
FIG. 1A illustrates a first non-limiting example of a generalized gaming environment configured in accordance with certain embodiments of the disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "requesting", "forwarding", "updating". "enabling", "establishing", "tracking", "calculating" "executing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, the gaming platforms and respective parts thereof disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

The term "criteria" used in this patent specification should be expansively construed to include any compound criterion, including, for example, several criteria and/or their logical combinations.

As used herein, the terms "game-related campaign" and "campaign" should be expansively construed to include a set of wagering requirement rules that entitle the player to a reward and, optionally, a set of marketing messages (e.g. banners, news tickers, etc.) and/or a set of instructions for prompting the messages.

"Wagering requirement rules" include one or more wagering conditions specified in a campaign that, if met by the player that is offered the campaign, entitle the player to the reward specified in the campaign. Some non-limiting examples of rewards include, e.g., receiving bonus wagering money or credits, free game play (e.g. "free spin", etc.), a certain player tag (e.g. 'VIP', etc.), an opportunity to play another game such as a new game not yet available to the general public, etc. By way of non-limiting example, a wagering requirement rule can specify, e.g., that if the player bets $100 on any game today, the player will receive $10 towards playing game X, or that if the player bets more than $500 in a one week period, the player will receive better odds the next time the game is played, etc.

By way of non-limiting example, a set of marketing messages and instructions for prompting the messages can respectively include, e.g., a banner-type digital advertisement for displaying in the game (e.g. "Only today! Bet $100 on any game and get $10 free cash on game X", etc.), and instructions specifying that the banner is to be displayed upon player's next log in if the player has not placed any wagers today; a marketing message (e.g. "Bet 530 more and get $10 free cash on game X", etc.), and instructions specifying that the message is to be prompted to a player upon the player's total wagers placed today reaching a predetermined threshold (e.g. $70) etc.

As used herein, the term "player-related data" includes data associated with the player and indicative of one or more tags, wagering requirement rules (as detailed above), messages, and/or statuses associated with the player (including. e.g. the player's status in one or more campaigns).

As used herein, the term "tags" includes attributes characterizing a given player or player account, or a player group to which the given player or player account belongs (e.g. VIP player, female, high-risk, etc.). Tags can be used by the game engine to unlock certain game features or game enhancements for players having the appropriate tag. Tags can also be used to identify certain players for whom a given campaign may be executed. By way of non-limiting example, a predetermined campaign may be executed only for players associated with a "VIP" tag.

A player's "status" in a campaign can be informative, for example, of the player's eligibility to participate in a given campaign, or the player's prior participation in the campaign (e.g. has/has not participated), etc. In some cases a player's status in a campaign can be informative of the player's current standing within a campaign, including multi-level campaigns. By way of non-limiting example, in a multi-level campaign, in which a player accumulates one "free spin" each day that the player plays the game online, and loses one "free spin" each day that the player does not play the game online, such that the player's status in the campaign can be informative of a current number of "free spins" available to the player.

As used herein, the term "messages" includes marketing messages as part of a campaign (as detailed above) and/or other types of in-game notifications, e.g. notifications about playing activity of other players, such as recent high winnings.

Messages to be communicated to a player can also include updates to campaigns, player status, or actions the player should take. For example, the messages can include "play game X to win a bonus", "you need to authorize your account for wallet transfers by providing a valid identification to the venue cashier". "go to the bar and say 'bar-bar-bar' to get a free drink". Messages can be communicated, for example, by outputting a dialog box or a rolling ticker to a game terminal being used by the player, by an alert send to the player's email or mobile phone (e.g. by SMS), etc.

As used herein, the term "game-related information" includes data related to a given player's current game play session obtainable from one or components (e.g., meters, data bus, etc.) of a gaming machine including without limitation data informative of one or more of: number of games played by the given player, number of minutes (or other time unit) played, wagers placed (including e.g. total amount wagered, mean wager, median wager, low wager, high wager, etc.) winnings achieved (including e.g. total winnings, mean winning, median winning, low winning, high winning, etc.).

Embodiments of the presently disclosed subject matter are not described with reference to any particular programming language. It will be appreciated that a variety of programming languages may be used to implement the teachings of the presently disclosed subject matter as described herein.

For purpose of illustration only, the following description is provided for an offline gaming platform operating autonomously of an online gaming platform. It should be appreciated that the teachings of the presently disclosed subject matter are, likewise, applicable to managing any kind of computerized gaming platform, including, without limitation, an online gaming platform operating autonomously of another online gaming platform.

Bearing this in mind, attention is drawn to FIG. 1A illustrating a first non-limiting example of a generalized gaming environment in accordance with certain examples of the disclosed subject matter. In certain embodiments, the gaming environment comprises an online gaming platform (100) operatively coupled to one or more online gaming clients (110), via a communication network (e.g. wired and/or wireless network including an Internet-based network). Online gaming platform (100) comprises a processor (102) operatively coupled to a memory (104). The memory (104) further comprises a database (108) configured to store, inter alia, player-related data associated with respective player accounts at online gaming platform (100). Player-related data can be associated with a respective player and player's account with the help of a unique player's identification referred to hereinafter as player ID. The platform is configured to associate credentials available to a player (e.g. user name and password, ID of mobile telephone, etc.) with respective player ID. Optionally, player ID can be used as a credential introduced by respective player.

As will be further detailed with reference to FIGS. 2-4, the processor (102) can be configured to execute several functional modules related to operating a computerized wagering game in accordance with computer-readable instructions implemented on a non-transitory computer-readable storage medium. Such functional modules are referred to hereinafter as comprised in the processor. Processor (102) comprises a server-side game engine (106) configured to run server side game functions (including receiving input data from one or more game clients, executing logic of one or more games accordingly, and reporting outcome(s) to the game clients in accordance with gaming principles and rules) and an online campaign manager (107) configured to enable game campaigns, as will be detailed below with reference to FIGS. 2-4.

Online gaming client (110) is configured to execute a client side of one or more games (111). The sharing of functions between the game platform 100 and the online game clients can vary depending on the game and implementation thereof, for example the game client can provide only functions of input/output and/or additionally execute certain programs related to output graphics and/or additionally execute part or all programs related to a game logic and exchange the data with the game platform, etc. In certain embodiments, online gaming client (110) can be associated with a personal computer (PC), mobile computing device (e.g. laptop, tablet, mobile phone, etc.), land-based game terminals or any other suitable device having input and display capabilities and capable to communicate with the gaming platform (100) directly or via a communication network.

In certain embodiments, online campaign manager (107) can cause a game campaign to be executed for a given player on the online gaming platform. To that end, online campaign manager (107) can be configured to access the player-related data stored in database (108) for a player playing a game on gaming client (110), determine, in accordance with predefined rules stored in the memory 104, a game campaign to execute for the player, and update the server side game engine (106) or the client-side game engine (113) (either directly or via server-side game engine (106)) or both the server side game engine (106) and client-side game engine (113) to execute the game campaign.

The gaming environment further comprises an offline gaming platform (112), e.g. at least one gaming machine, operating autonomously from online gaming platform (100). The offline gaming platform can be, e.g. a retail-based gaming platform (i.e. a game platform operating in a retail environment). For purpose of illustration only, the following description is provided for an offline gaming platform being an electronic gaming machine ("EGM"). As used herein, in addition to its ordinary meaning as understood by those skilled in the art, an "EGM" should be understood to include a handheld unit provided by a gaming venue for playing games within the venue. Those skilled in the art will readily appreciate that the teachings of the presently disclosed subject matter are, likewise, applicable to other offline gaming platforms.

Each EGM comprises a processor (114) operatively coupled to a memory (116) via a data bus (122). In certain embodiments, EGM (112) can further comprise one or more meters (115) configured to record game-related information and transfer game-related information between components of the EGM (or between the EGM and other systems external to the EGM) via data bus (122).

Processor (114) comprises at least one game engine (120) (also referred to herein as "offline game engine"), configured to run at least one offline game. Processor (114) further comprises an inter-platform wagering module (126) ("WM") configured to, inter alia, operatively couple EGM (112) and online gaming platform (100) (e.g. via a wired or wireless data communication network, e.g. Internet-based network, etc.), obtain player-related data (e.g. from database (108) directly or via the online campaign manager (107), etc.) and enable EGM (112) to execute one or more game-related campaigns in accordance with the obtained player-related data, as will further be detailed below with respect to FIGS. 2-4.

Figure 1B:
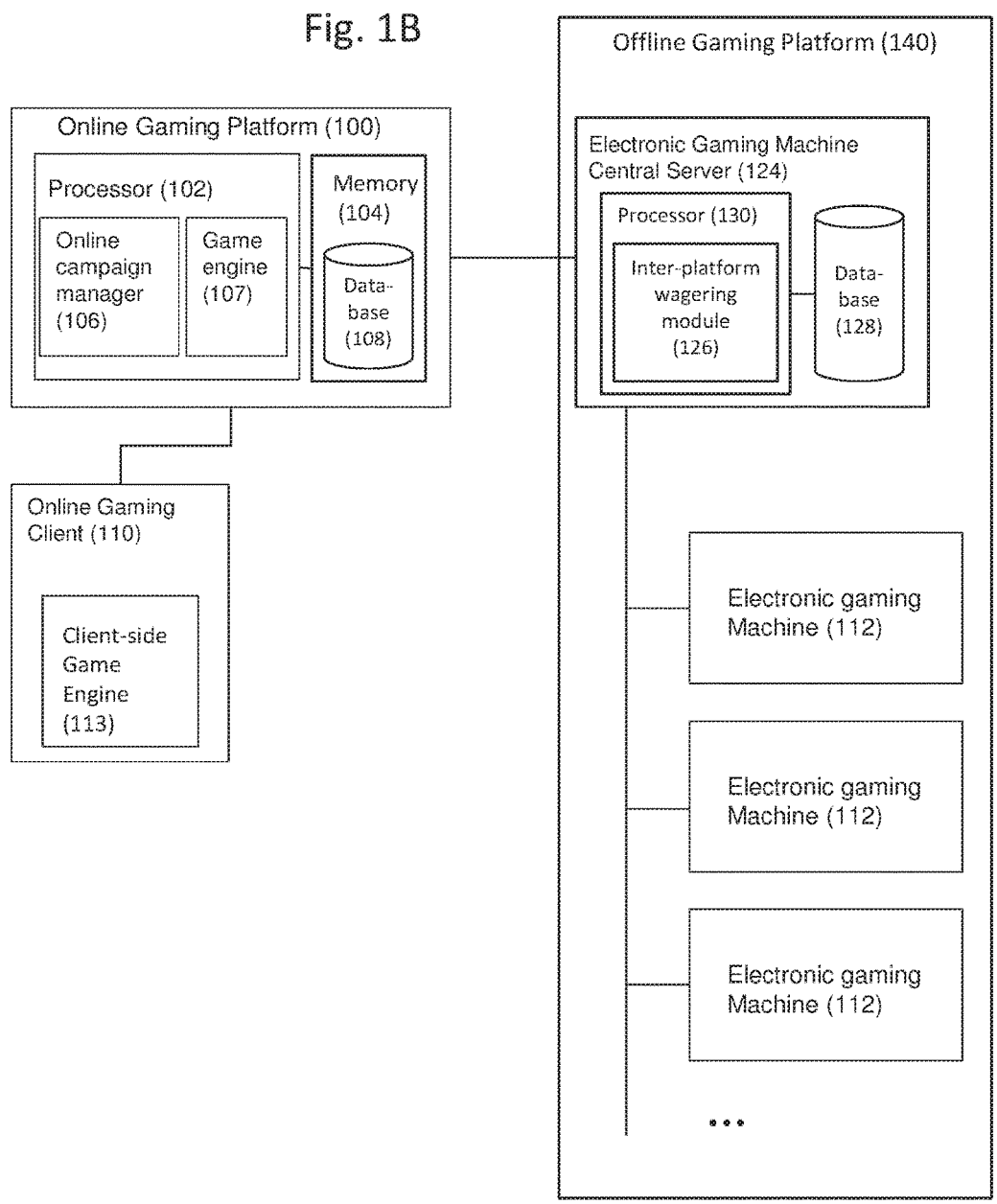
FIG. 1B illustrates a second non-limiting example of a generalized gaming environment configured in accordance with certain embodiments of the disclosed subject matter.

FIG. 1B illustrates a second non-limiting example of a generalized gaming environment in accordance with certain examples of the disclosed subject matter. Offline platform (140) comprises one or more EGMs (112) operatively coupled to an EGM central server (124), either directly or via an intermediary component such as, e.g. a local proxy server (not shown). The EGM central server (124) includes a processor (130) operatively coupled to a database (128) and configured to run server side functions related to operating games provided by EGMs. Client-side functions related to game operation are provided by respective EGMs.

The platform (140) is configured to provide a player with permanent or temporary player ID uniquely identifying the player for any one of EGMs of the platform (140). The platform (140) is further configured to associate credentials available to a player (e.g. token number, etc.) and provided to any one of EGMs with the player ID. For example, in this embodiment, EGM central server (124) can store in database (128) data related to EGM players (including e.g. a player's wallet balance) and associated with respective EGM players with the help of the player ID. A player can play at any of the coupled EGMs (112) by using credentials indicative of respective player ID. Thus, for example, the player can use centrally stored wallet balance rather than inserting cash or credits to the various EGMs separately.

It is noted that database (108) is operable in accordance with player IDs associated with the players by platform (100), while database (128) is operable in accordance with player IDs independently associated with the players by platform (140).

Processor (130) comprises WM (126) which can be configured to operatively couple the EGM central server (124) to online gaming platform (100) and to enable EGMs (112) to execute game campaigns based on player-related data obtained by WM (126) from the online gaming platform (100), as will further be detailed with reference to FIGS. 2-4.

It is noted that in the gaming environments illustrated in FIGS. 1A-1B, the offline gaming platform or parts thereof, in some cases may not be configured to communicate with the online gaming platform other than via the WM. In other cases, the offline gaming platform can be configured to communicate with the online gaming platform without WM for certain purposes not related to executing game campaigns.

It is noted that while in embodiments illustrated with reference to FIGS. 1A-1B, the WM is integrated with off-line platform (112) or (140), in other embodiments WM can be executed by a processor separate from the gaming platforms (100), (112) or (140).

For purposes of illustration in the description that follows, reference is made to an offline gaming platform and online gaming platform operating autonomously of each other. It should be appreciated by those skilled in the art that the teachings herein are likewise applicable to a pair of autonomously operating online gaming platforms.

Figure 2:
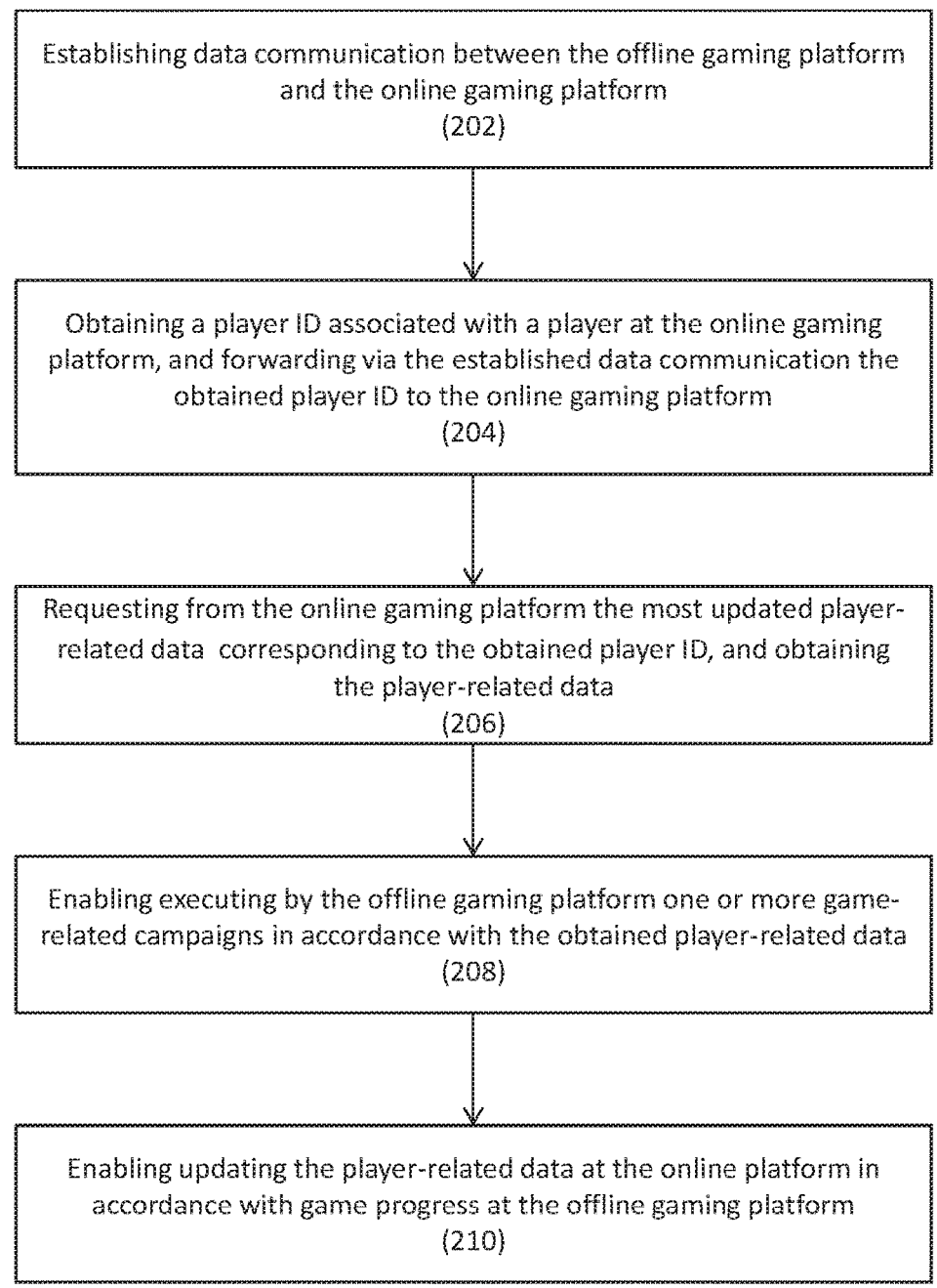
FIG. 2 illustrates a generalized flow chart of operating a processor-based inter-platform wagering module in accordance with certain embodiments of the disclosed subject matter.

FIG. 2 illustrates a generalized flow chart of operating a processor-based inter-platform wagering module (WM) (e.g. WM (126)) in accordance with certain embodiments of the disclosed subject matter. In certain embodiments, the WM is configured to operate in conjunction with a first computerized gaming platform and a second computerized gaming platform, where first computerized gaming platform and second computerized gaming platform operate autonomously of each other. In certain embodiments, as will be detailed below, WM (126) can be configured to enable data communication between the first computerized gaming platform and the second computerized gaming platform. In certain embodiments, the first gaming platform can be an offline gaming platform, e.g. EGM (112) or offline gaming platform (140), and the second gaming platform can be an online gaming platform, e.g. online gaming platform (100).

In certain embodiments, WM (126) is configured to establish (202) data communication between the first and the second game platforms. WM (126) can be further configured to obtain (204) at the first gaming platform data indicative of a player ID valid for the second gaming platform and forward the data indicative of a player ID to the second gaming platform. In certain embodiments the data indicative of player ID can be, e.g., a username or other log in credentials capable of identifying the player on the second gaming platform. Thus for example. Bob Smith has credentials "bsmith" indicative of his player ID at an online gaming platform which he uses to play games via a web browser and accumulates bonus credits when certain wagering thresholds are met. Bob goes to a casino and plays the same game at an EGM on the casino floor where no player ID is required in order to play the game. The EGM operates autonomously from the online gaming platform. The EGM can be configured to prompt Bob to enter data indicative of his player ID (or swipe a card containing an embedded player ID) valid for the online gaming platform. Bob inputs credentials "bsmith"

to the EGM, which is then forwarded to the online gaming platform via the data communication established by the WM.

In certain embodiments WM (126) can be configured to request (206), from the second gaming platform (e.g. using one or more APIs) the most updated player-related data corresponding to the player ID, and to obtain the player-related data, e.g. by querying the player profile associated with the player ID. In certain embodiments, the WM can request and obtain the player-related data on behalf of the first gaming platform. In certain embodiments, e.g. in cases where there is not always available a suitable means of data communication between the first and second gaming platforms, the WM can be configured to wait until a suitable means of communication is available, establish a data connection between the first and second gaming platforms, transfer the player ID to the second gaming platform, request the player-related data from the second gaming platform, obtain the player-related data from the second gaming platform, and, optionally, disconnect from the second gaming platform.

In certain embodiments, the WM can be configured to request the player-related data in response to one or more predetermined triggering events. By way of non-limiting example, the WM can be configured to request the player-related data in response to:
- the player logging in to the first gaming platform (if the first gaming platform is configured as such) or otherwise initiating a game session at the first gaming platform;
- the WM determining the availability of a suitable means of communication with the second gaming platform;
- the player selecting a predefined game to play on the first gaming platform;
- events predefined by logic of a game being played, etc.

In certain embodiments WM (126) can be configured to enable the first gaming platform to execute (208) one or more game-related campaigns in accordance with the obtained player-related data, for example as detailed below with reference to FIG. 3. For example, the game engine in the first gaming platform can use (in pull or push mode) the player-related data obtained by the WM to determine that the player is eligible for one or more game-related campaigns (e.g. a bonus feature, a bonus game, bonus credits, etc.), and execute the one or more game-related campaigns for the player, thereby enabling a common campaign for the first gaming platform and second gaming platform. Executing a game-related campaign can include, for example, modifying game behavior. It should be noted that executing a game-related campaign can include communicating the one or more messages to the player, e.g. by outputting the one or more messages to an output device of the first gaming platform or by sending the player an alert using other means, such as email or SMS, as detailed above. In certain embodiments, the first gaming platform can execute the game-related campaign upon receiving confirmation from the WM that certain wagering requirement rules have been met. The game engine can then execute the campaign. e.g. by unlocking a certain game feature or assigning the player a new player status.

In certain other embodiments, at least part of the game-related campaign can be executed by WM, e.g. by initiating adding credits to the player's balance.

In certain embodiments, WM (126) can be configured to obtain data indicative of game progress in the game played at the first gaming platform, and update (210), e.g. using one or more APIs, the player-related data in the second gaming platform in accordance with the obtained game progress. The data indicative of game progress can include, by way of non-limiting example, an indication that a certain game-related campaign was executed and/or a certain game level was achieved and/or a certain player level was achieved, etc., which would necessitate updating the player-related data associated with the player at the second gaming platform. In certain embodiments, obtaining data indicative of game progress and/or updating player-related data can be performed periodically or in response to a predefined event (e.g. the availability of a suitable communication link with the second gaming platform, the player finishing the game session, etc.).

In certain embodiments, as detailed above, the obtained player-related data can include one or more wagering requirement rules relevant to the respective player and campaign, in which case enabling the first gaming platform to execute a game-related campaign can include calculating a wagering bonus.

Figure 3:
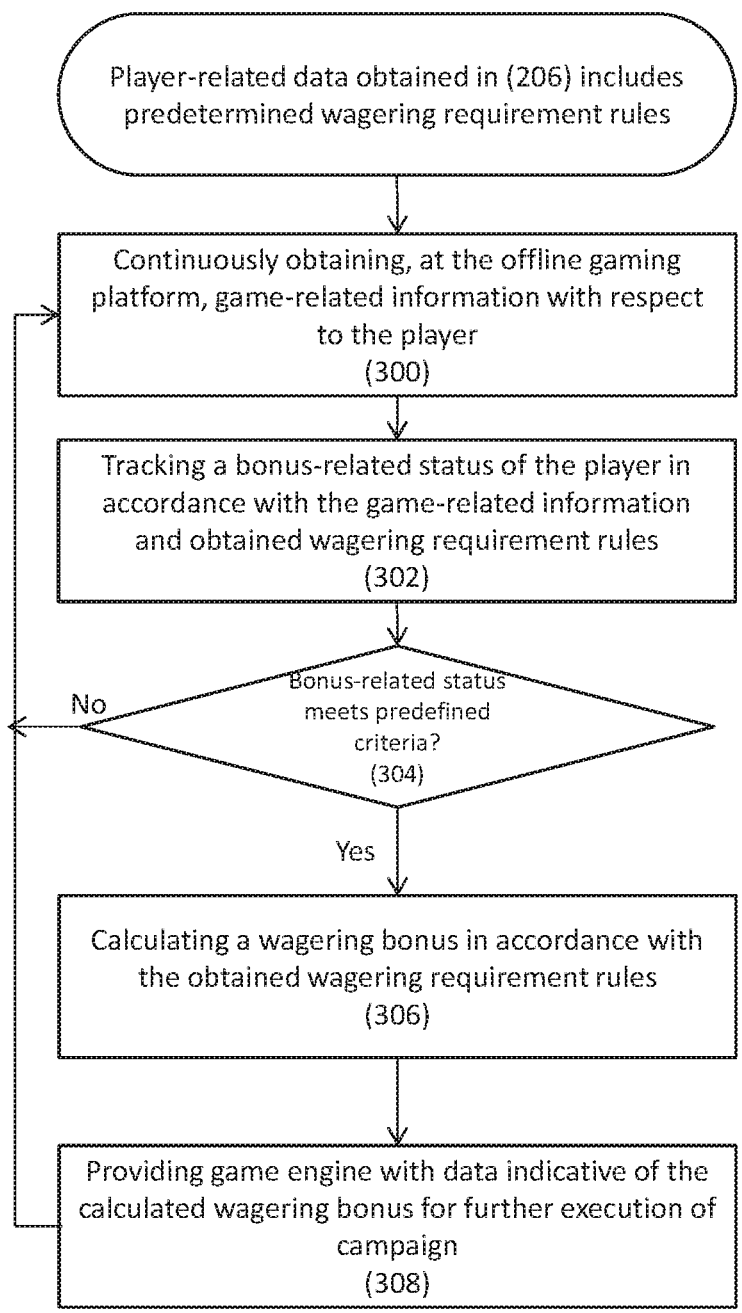
FIG. 3 illustrates a generalized flow chart of calculating a wagering bonus in accordance with certain embodiments of the presently disclosed subject matter.

Referring now to FIG. 3, there is illustrated a generalized flow chart of calculating a wagering bonus in accordance with certain embodiments. WM (126) can be configured to continuously obtain (300) at the first gaming platform, game-related information with respect to the player. Game-related information can include, e.g. the number of games played on the first gaming platform in a predetermined time period, the amount of wagers placed in a predetermined time period, etc. By way of non-limiting example, the WM can be configured to obtain game-related information, e.g. from meters (115) and/or data bus (122). Unless specifically stated otherwise, it is appreciated that throughout the specification the terms "continuously obtain game-related information" refers to receiving (in push or pull mode) game-related information substantially each time new game-related information is available. In a "pull" mode, the availability of new game-related information can be defined by configuration of the system specifying when to pull the game-related information. The term "continuously obtaining game-related information" refers to continuously receiving a given required game-related information and/or processing the continuously received game-related information in order to derive the given required game-related information.

In certain embodiments, WM can be configured to track (302) a bonus-related status of the player in accordance with the game-related information and the obtained player-related data which includes wagering requirement rules specifying predefined criteria for getting a bonus. WM can be configured to determine (304) if the bonus-related status meets the predefined criteria as specified by wagering requirement rules. By way of non-limiting example, in accordance with the wagering requirement rules, a bonus-related status of the player is met upon the player having played at least ten games in the last ten days and having wagered at least ten dollars in the last thirty minutes. If the bonus-related status meets the predefined criteria, WM can be configured to calculate (306) a wagering bonus in accordance with the predetermined wagering rules. By way of non-limiting example, the wagering requirement rules can specify that, upon the player's bonus-related status meeting the predefined criteria, the player is to receive a certain wagering bonus. By way of non-limiting example the wagering bonus can be, e.g., a cash prize, a "top-up" to a future wager placed (i.e. the player can put up $5 to place a wager of $7), etc. The WM can be configured to provide (308) to a game engine on the first gaming platform data indicative of the calculated wagering bonus for further execution of the campaign (which can include, e.g. updating the player's wallet balance, outputting a message, applying a "top-up", etc.).

For purpose of illustration only, the above description of WM operating is provided for WM running on a certain EGM. Those skilled in the art will readily appreciate that the teachings of the presently disclosed subject matter are, likewise, applicable to WM running on EGM central server. In such a case, WM and EGM can exchange the relevant information via the EGM central server.

Further, EGM central server can be configured to store data related to EGM players (including e.g. a player's wallet balance), and WM can be configured to update, in accordance with off-line game progress, the data related to EGM players and thus enable continuous wagering calculations for players using several EGMs. Further still, WM can be configured to execute a game-related campaign using a combination of player-related data stored on the online gaming platform and data related to EGM players stored on the offline gaming platform.

Figure 4:
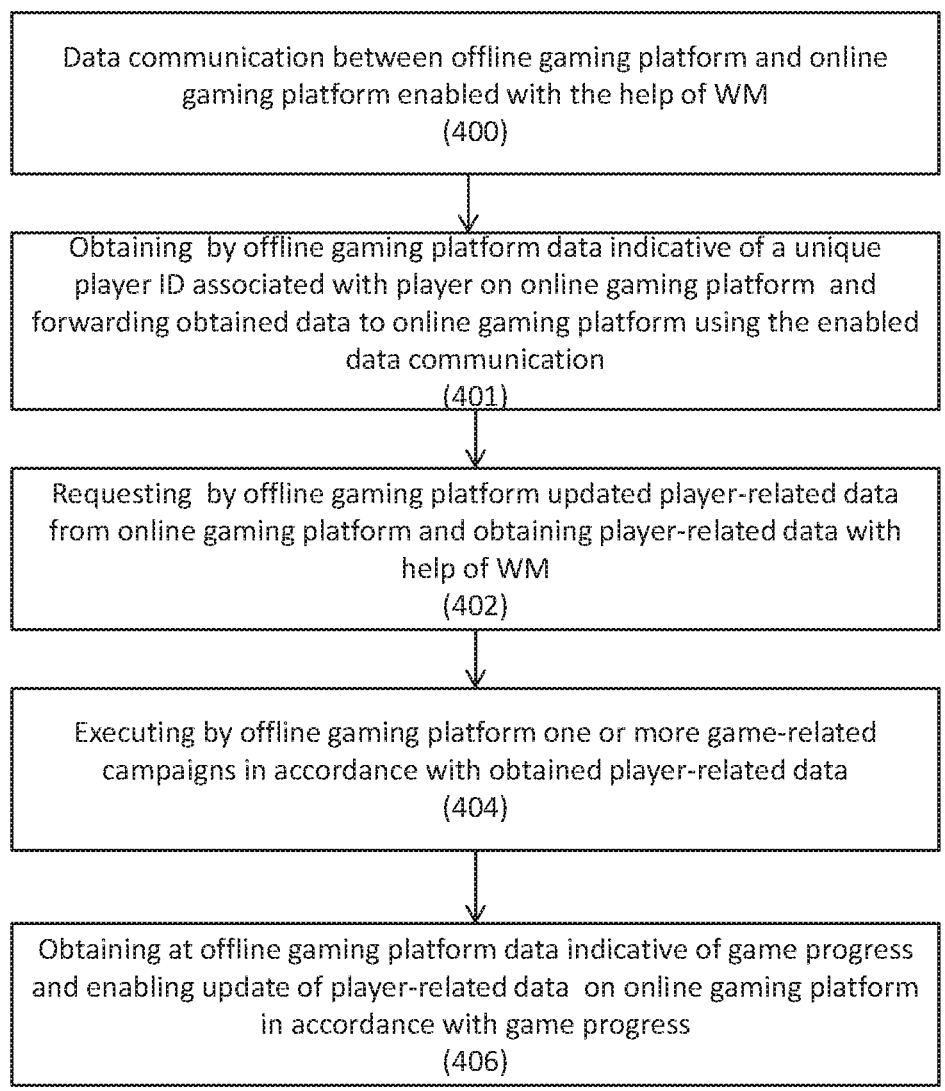
FIG. 4 illustrates a generalized flow chart of operating an offline gaming platform in accordance with certain embodiments of the disclosed subject matter.

FIG. 4 illustrates a generalized flow chart of operating a first computerized gaming platform, in accordance with certain embodiments of the disclosed subject matter.

In certain embodiments the first computerized gaming platform can be an offline gaming platform, including, e.g. EGM (112) or offline gaming platform (140), while the second computerized gaming platform can be, e.g. online gaming platform (100).

In certain embodiments, the offline gaming platform can be configured to obtain (401) data indicative of a unique player ID associated with a given player at the online gaming platform, and to forward the obtained data indicative of a player ID to the online gaming platform via a data communication enabled by the WM, as further detailed above with reference to FIG. 2.

In certain embodiments, the offline gaming platform can be configured to, with the help of the WM, request (402) from the online gaming platform the most updated player-related data corresponding to the player ID, and to obtain the player-related data, as further detailed above with reference to FIG. 2.

Having obtained the player-related data from the online gaming platform, in certain embodiments, the offline gaming platform (e.g. using game engine (120)) can be configured to execute (404) one or more game-related campaigns in accordance with the obtained player-related data, as further detailed above with reference to FIG. 3.

In certain embodiments, the offline gaming platform can be configured to obtain (406) data indicative of game progress made in a game played by the player at the offline gaming platform, and to enable updating of the online gaming platform in accordance with the game progress, as further detailed above with reference to FIG. 2.

Figure 5:
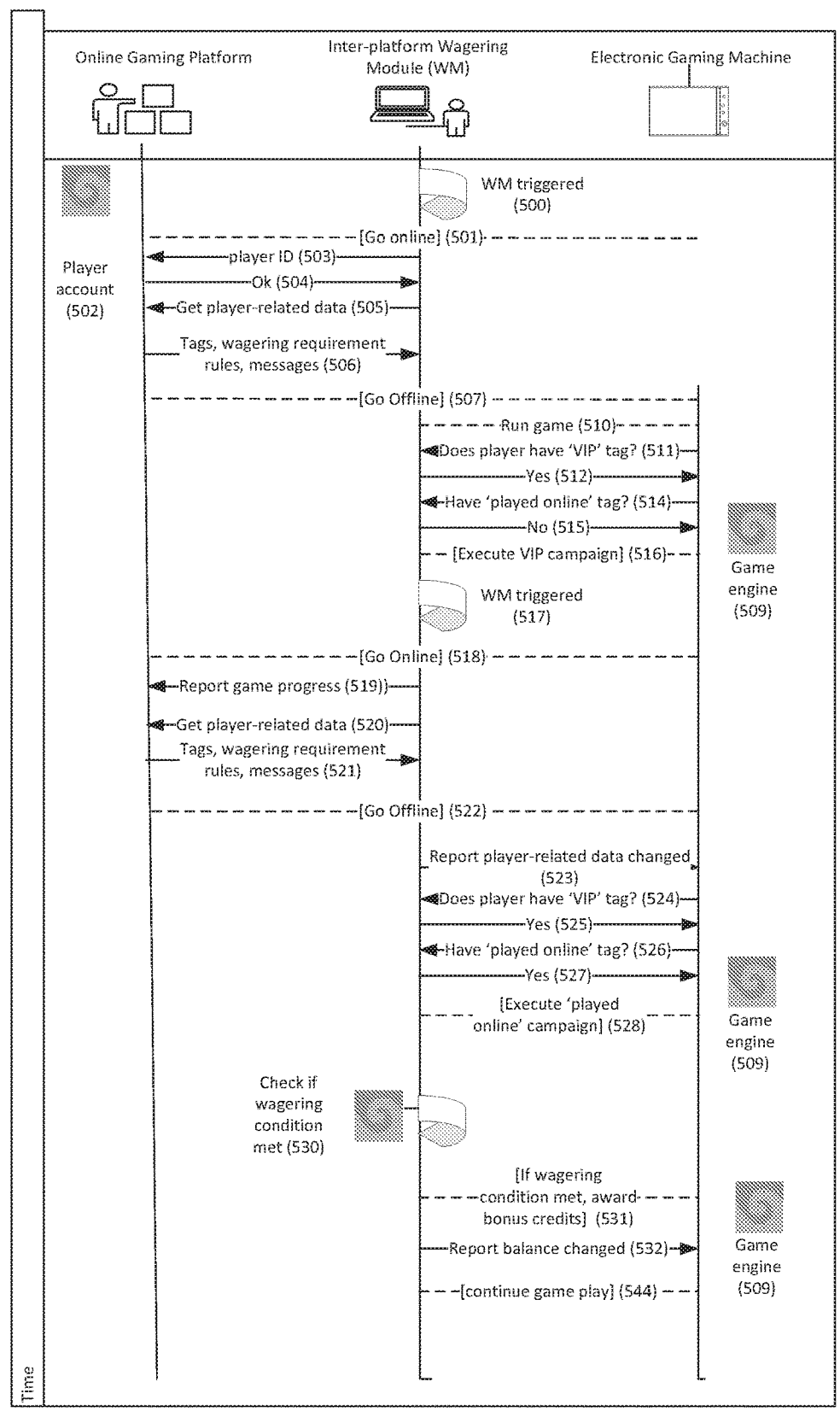
FIG. 5 illustrates a non-limiting example of data flows between an offline gaming platform and an online gaming platform operating autonomously of the offline gaming platform, in accordance with certain embodiments of the disclosed subject matter.

FIG. 5 illustrates a non-limiting example of data flows between an offline gaming platform (e.g. EGM (112)), and an online gaming platform (100) operating autonomously of the offline gaming platform using an inter-platform wagering module configured to enable data communication between the offline gaming platform and the online gaming platform, in accordance with certain embodiments of the disclosed subject matter.

In the example illustrated in FIG. 5 a VIP campaign is executed if the player is a VIP player (i.e. the player-related data associated with the player includes a "VIP" tag; a Played Online campaign is executed if the player has played the game online (i.e. the player-related data includes a "played_online" tag); and, irrespective of whether the VIP and/or Played Online campaigns are executed, bonus credits are awarded if the player wagers a certain amount.

First, the WM is triggered (500) in response to the player at the EGM inputting a player ID valid on the online gaming platform, prompting the WM to go online (501) (i.e. by connecting to the online gaming platform). The WM passes the player ID to the online gaming platform (503), where it is matched to a player account (502). At this point the online gaming platform confirms the player ID is valid by returning "ok" (504). The WM queries the online gaming platform for player-related data associated with the player account matched to the player ID (505). In response, the online gaming platform returns tags, wagering requirement rules and messages associated with the player account (506). At this point the WM can go offline by disconnecting from the online gaming platform (507). The WM continuously obtains game progress from the EGM, including e.g. which campaigns were executed. WM also tracks a bonus-related status of the player, e.g. using data collected from the EGM's meters, and determines if the player's bonus-related status meets a predefined criteria, e.g. a certain wagering condition, in order to obtain bonus wagering credits.

The player chooses a game to play by selecting the game from a menu, and the EGM executes the game using the offline game engine (509). When the game launches, the offline game engine queries the WM whether the player has a 'VIP' tag (511), to which the WM confirms that the player does indeed have a 'VIP' tag (512). The offline game engine further queries the WM whether the player has a 'played_online' tag (514), to which the WM confirms that the player does not have a 'played_online' tag (515). Offline game engine (509) is then adapted to execute a VIP campaign (516) (e.g. by unlocking certain game features, providing enhanced game functionality, or offering improved Return to Player (RTP) (i.e. the percentage of all the wagered money a game machine will pay back to players over time) and the player plays the game.

Responsive to a predefined event (e.g. periodically, after game exit, upon detecting suitable network availability, etc.), the WM is triggered again (517) prompting WM to go online (518) and report the game progress (519) as tracked by the WM to the online gaming platform (e.g. using the player ID to identify the player to online gaming platform). The reported game progress can include, e.g. that the player used the VIP campaign. This may trigger the online campaign manager (106) of the online gaming platform to change at least some of the player-related data stored in the online gaming platform. The WM then requests the most updated player-related data from the online gaming platform (520). In response, the WM receives updated tags, wagering requirement rules, and messages (521), and goes offline (522).

The WM may inform the offline game engine (509) that the player-related data has changed (523). In response, the offline game engine queries the WM whether the player has the 'VIP' tag (524), and the WM confirms that the player does have a 'VIP' tag (525). The offline game engine further queries the WM whether the player has a 'played_online' tag (526), and the WM confirms that the player does have a 'played_online' tag (527) (e.g. the player might have played online using his mobile phone while still playing at the EGM). Offline game engine (509) is then adapted to execute a Played Online campaign (528) (e.g. by unlocking certain game features, providing enhanced game functionality, or offering improved RTP).

As noted above, the player-related data obtained from the online gaming platform can include wagering requirement rules for the given player specifying a wagering condition which, if met, results in the given player being awarded bonus wagering credits. In that case, the WM checks, during the game play session, if the wagering condition is met (530). If the wagering condition is met, the WM calculates and awards the bonus wagering credits (531) in accordance with the wagering requirement rules obtained from the online gaming platform, or updates the offline game engine (509) to award bonus wagering credits. WM reports the changed wallet balance (532) to the online gaming platform, and game play continues.

It should be appreciated that in certain embodiments, using the WM, a game on the EGM can be configured to check if the player playing the game has a certain tag or status in a campaign (and adapt the game logic accordingly), give a bonus to a player in the middle of the game based on wagering rules set up in the online gaming platform, receive updates that a player account has changed as a result of player activity online, and/or provide in-game notifications about activity, e.g. high wins, etc. occurring on other game machines (EGMs or online gaming clients) playing the same game. It should further be appreciated that the functionality described above can in some cases be performed while the EGM is disconnected from the online gaming platform based on player-related data received previously by the WM prior to disconnecting from the online platform.

It should be noted that the invention further contemplates an EGM having a game engine adaptable to execute a game-related campaign for a player, and WM configured to operatively couple the EGM to an autonomously operated online gaming platform having stored therein player-related data associated with a player and informative of a game-related campaign to execute for the associated player, where the EGM is configured to query, using the WM, the online gaming platform for player-related data associated with a given player, obtain, using the WM, player-related data from the online gaming platform in response to the query, and adapt the game engine in accordance with the obtained player-related data to execute a game-related campaign for the given player.

It is noted that the teachings of the presently disclosed subject matter are not bound by the gaming platforms described with reference to FIGS. 1A-1B. Equivalent and/or modified functionality can be consolidated or divided in another manner and can be implemented in any appropriate combination of software with firmware and/or hardware and executed on a suitable device. The gaming platforms (100). (112) and/or (140) can be implemented as one or more standalone network entities, or integrated, fully or partly, with other network entities. Those skilled in the art will also readily appreciate that the data repositories can be consolidated or divided in other manner; databases can be shared with other systems or be provided by other systems, including third party equipment.

It is further noted that WM can be implemented as computer readable program code embodied on a non-transitory computer-readable storage medium. Alternatively or additionally, at least part of WM can be implemented as firmware ported to a certain processor such as, by way of non-limiting example, digital signal processor (DSP) or microcontrollers, or can be implemented as hardware or configurable hardware such as, by way of non-limiting example, field programmable gate array (FPGA) or application specific integrated circuit (ASIC).

It is further noted that the teachings of the presently disclosed subject matter are not bound by the flow charts illustrated in FIGS. 2-5, and the illustrated operations can occur out of the illustrated order. For example, operations (404) and (406) shown in succession can be executed substantially concurrently or in the reverse order. It is also noted that whilst the flow chart is described with reference to elements of certain components of gaming platforms (100), (112) and (140), this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a first computerized gaming platform comprising:
   enabling data communication between the first computerized gaming platform and a second computerized gaming platform with help of an inter-platform wagering module (WM), wherein the second computerized gaming platform operates autonomously of the first gaming platform such that data related to a given player at the first gaming platform are accessible using a first unique player identification (player ID) and data related to the given player at the second gaming platform are accessible using a second player ID whilst are not accessible using the first player ID;
   obtaining at the first gaming platform data indicative of the second player ID, and forwarding, via the enabled data communication, the obtained data indicative of the second player ID to the second gaming platform;
   requesting, with the help of the wagering module, from the second gaming platform the most updated data related to the given player and corresponding to the second player ID, and obtaining, with the help of the wagering module, the requested player-related data; and
   executing by the first gaming platform one or more game-related campaigns for the given player in accordance with the obtained player-related data.

2. The method of claim 1, wherein the player-related data is indicative, at least, of one or more tags associated with the given player in the second gaming platform and/or one or more wagering requirement rules associated with the given player in the second gaming platform and/or the given player's status in the one or more campaigns available to the given player in the second gaming platform and/or data indicative of one or more messages to be communicated to the given player.

3. The method of claim 1, further comprising:
obtaining at the first gaming platform data indicative of a game progress made in a game played by the given player on the first gaming platform, and updating the player-related data at the second gaming platform in accordance with the obtained game progress.

4. The method of claim 1, wherein executing the one or more game-related campaigns is enabled by the WM, said WM being configured to:
continuously obtain, with respect to the given player, game-related information at the first gaming platform;
track a bonus-related status of the given player in accordance with the game-related information and wagering requirement rules;
when the bonus-related status meets predefined criteria, calculate a wagering bonus in accordance with the wagering requirement rules; and
provide data indicative of the calculated wagering bonus to a game engine on the first gaming platform.

5. The method of claim 1, wherein the request for the player-related data is made in response to at least one predetermined triggering event selected from the group consisting of:
the given player logging into the first gaming platform;
a determination of an availability of suitable means of communication with the second gaming platform;
the given player selecting a predefined game to play on the first gaming platform; and
an event predefined by logic of a game being played on the first gaming platform.

6. The method of claim 1, wherein the first gaming platform is either an offline gaming platform or an online gaming platform, and the second gaming platform is an online gaming platform.

7. The method of claim 1, wherein the first gaming platform comprises an electronic gaming machine (EGM) central server operatively coupled to one or more EGM clients, wherein the WM is comprised in the EGM central server.

8. The method of claim 1, wherein the first gaming platform is an electronic gaming machine (EGM), wherein the WM is comprised in the EGM.

9. The method of claim 1, wherein the WM is integrated with the first gaming platform.

10. The method of claim 1, wherein the WM is executed by a processor separate from the first and second gaming platforms.

11. A processor-based inter-platform wagering module (WM) configured to operate in conjunction with a first computerized gaming platform and a second computerized gaming platform, the platforms configured to operate autonomously one of the other, wherein data related to a given player at the first gaming platform are accessible using a first unique player identification (player ID) and wherein data related to the given player at the second gaming platform are accessible using a second player ID whilst are not accessible using the first player ID,
the WM configured to:
establish data communication between the first gaming platform and the second gaming platform;
obtain at the first gaming platform data indicative of the second player ID, and forward, via the established data communication, the obtained data indicative of the second player ID to the second gaming platform;
request from the second gaming platform the most updated data related to the given player and corresponding to the second player ID and obtain the requested player-related data; and
enable execution by the first gaming platform of one or more game-related campaigns for the given player in accordance with the obtained player-related data.

12. The WM of claim 11, wherein the player-related data is indicative, at least, of one or more tags associated with the given player in the second gaming platform and/or one or more wagering requirement rules associated with the given player in the second gaming platform and/or the given player's status in the one or more campaigns available to the given player in the second gaming platform and/or data indicative of one or more messages to be communicated to the given player.

13. The WM of claim 11, wherein the WM is further configured to obtain data indicative of a game progress made in a game played by the given player on the first gaming platform, and to enable updating the player-related data at the second gaming platform in accordance with the obtained game progress.

14. The WM of claim 11, wherein the WM is further configured to:
continuously obtain, with respect to the given player, game-related information at the first gaming platform;
track a bonus-related status of the given player in accordance with the game-related information and wagering requirement rules;
when the bonus-related status meets predefined criteria, calculate a wagering bonus in accordance with the wagering requirement rules; and
provide data indicative of the calculated wagering bonus to a game engine at the first gaming platform.

15. The WM of claim 11, wherein the first gaming platform is either an offline gaming platform or an online gaming platform, and the second gaming platform is an online gaming platform.

16. The WM of claim 11, wherein the WM is integrated with the first gaming platform.

17. The WM of claim 16, wherein the WM is comprised in an electronic gaming machine (EGM).

18. The WM of claim 16, wherein the WM is comprised in an electronic gaming machine (EGM) central server.

19. The WM of claim 11, wherein the WM is executed by a processor separate from the first and second gaming platforms.

20. An electronic gaming machine (EGM) comprising:
a game engine adaptable to execute a game-related campaign for a given player, wherein data related to the given player at the EGM are accessible using a first unique player identification (player ID); and
an inter-platform wagering module (WM) configured to operatively couple the EGM to an autonomously operated online gaming platform having stored therein data related to the given player, and informative of the game-related campaign with respect to the given player, wherein the data related to the given player at the online gaming platform are accessible using a second player ID whilst are not accessible using the first player ID;
wherein the EGM is configured to:
query, using the WM, the online gaming platform for the data related to the given player and corresponding to the second player ID;

in response to said query, obtain, using the WM, from the online gaming platform the data related to the given player; and adapt the game engine in accordance with the obtained player-related data to execute a game-related campaign for the given player.

21. An offline gaming platform comprising an electronic gaming machine (EGM) central server operatively coupled to one or more EGM clients, the EGM central server comprising an inter-platform wagering module (WM) configured to:

establish data communication between the offline gaming platform and an online gaming platform, the two platforms operating autonomously one of the other, wherein data related to a given player at the offline gaming platform are accessible using a first unique player identification (player ID) and wherein data related to the given player at the online gaming platform are accessible using a second player ID whilst are not accessible using the first player ID;

obtain at the offline gaming platform data indicative of the second player ID, and forward, via the established data communication, the obtained data indicative of the second player ID to the online gaming platform;

request from the online gaming platform the most updated data related to the given player and corresponding to the second player ID and obtain the requested player-related data; and enable execution by the offline gaming platform of one or more game-related campaigns for the given player in accordance with the obtained player-related data.

* * * * *

UNITED STATES PATENT AND TRADEMARK OFFICE
CERTIFICATE OF CORRECTION

PATENT NO. : 10,304,282 B2  
APPLICATION NO. : 16/069078  
DATED : May 28, 2019  
INVENTOR(S) : Michael Fox et al.

Page 1 of 1

It is certified that error appears in the above-identified patent and that said Letters Patent is hereby corrected as shown below:

On the Title Page

Item (71):  
Cancel the text "Applicants: PLAYTECH SOFTWARE LIMITED, Douglas (GB); Michael Fox, Walsall (GB); Ethan Ram, Herzliya (IL)"  
And Insert --Applicant: PLAYTECH SOFTWARE LIMITED, Douglas (GB)--

Signed and Sealed this  
Twenty-second Day of October, 2019

Andrei Iancu  
*Director of the United States Patent and Trademark Office*